Jan. 10, 1950  Y. SAMALION  2,494,265
FLASHLIGHT
Filed July 10, 1946
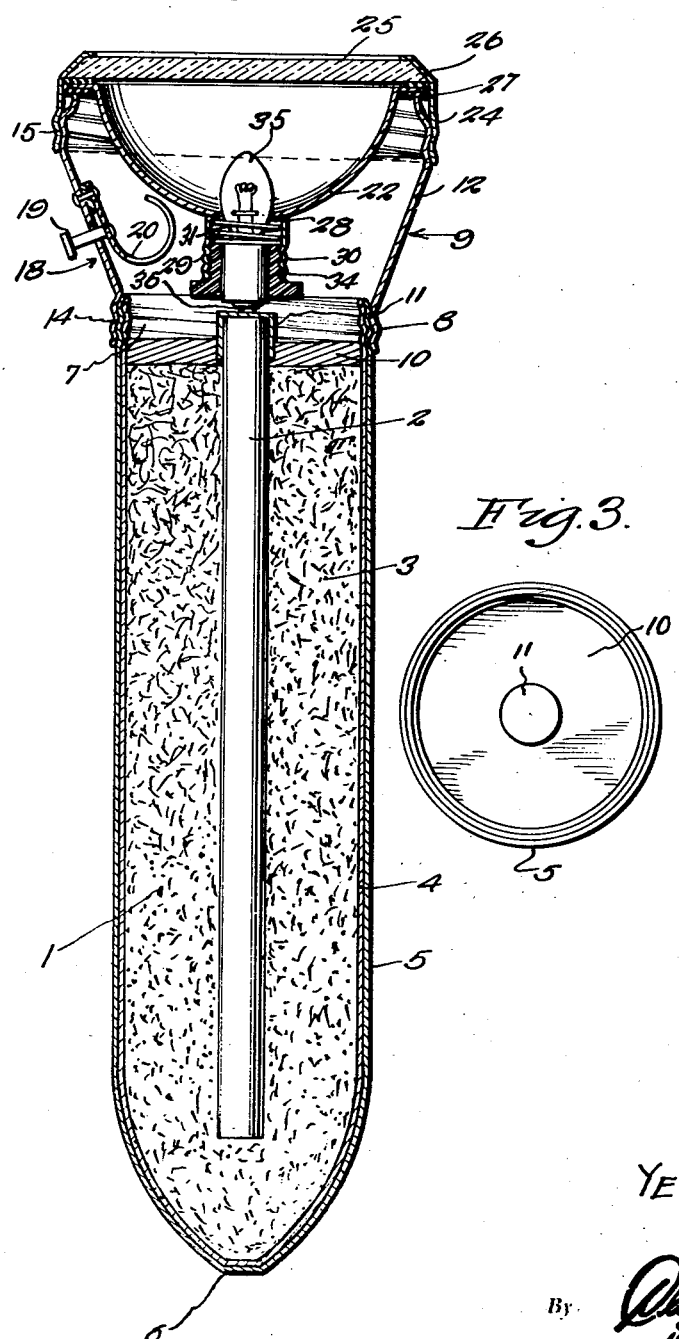
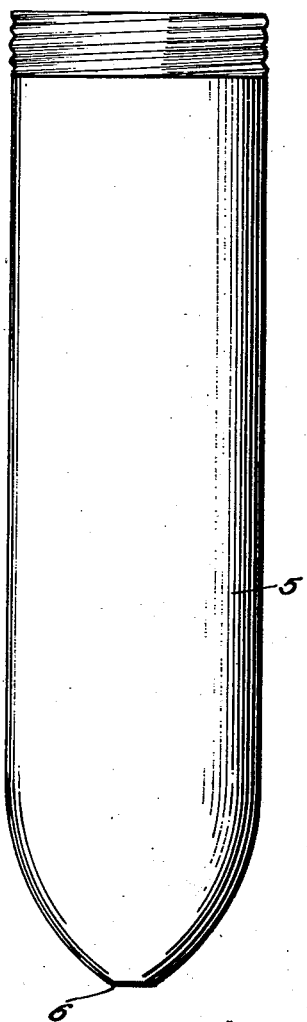
Inventor
YETTA SAMALION
By Clarence A. O'Brien
and Harvey B. Jacobson
Attorneys Patented Jan. 10, 1950

2,494,265

UNITED STATES PATENT OFFICE 2,494,265

FLASHLIGHT

Yetta Samalion, Miami Beach, Fla.

Application July 10, 1946, Serial No. 682,701

1 Claim. (Cl. 240—10.61)

This invention relates to electrical flashlights and it has for its purpose to provide a flashlight without casing in which the battery cell is an integral part of the mechanical structure and serves as a handle forming body to which the remainder of the flashlight is attached.

It is an object to simplify the mechanical structure and to reduce the weight and the bulk of the flashlight as far as possible.

A further object consists in providing a dry cell battery with a double coating foil or shell, one of these coatings, foils or shells forming an outer cover, surrounding the electrode forming shell or foil of the dry cell battery, but forming an inseparable part thereof and simulating some attractive material, which protects the battery and prevents direct contact with the outer electrode of the battery.

Further objects will be apparent from the following specification.

One embodiment of the invention is illustrated in the accompanying drawing. It is to be understood that this is not the sole embodiment and that it is merely an example serving to explain the principle on which the invention is based.

Other embodiments using the same principle may be constructed by experts skilled in the art using the principle explained, and these further embodiments are therefore not departures from but parts of the invention.

In the drawing:

Figure 1 is a sectional elevational view of a flashlight.

Figure 2 is an elevational view of a battery.

Figure 3 is a plan view thereof.

According to the invention the battery cell 1 of the flashlight serves as the handle forming body of the flashlight. Said battery cell, as usual, is provided with an inner centrally arranged carbon electrode 2, an electrolyte 3, filling the cell and with a double outer cover. The inner part of said cover is formed by the negative electrode 4 of the cell made of zinc. The outermost or exterior cover of the cell is formed by a further sheet, foil or layer 5 preferably made of metal, as shown, which provides an attractive exterior and serves to avoid direct contact of the zinc electrode with other objects. This outermost cover 5 of the dry cell may be used to simulate a cover of plastics, leather or of some other preferred material, it is a permanent inseperable part of the outer cover and of the dry cell.

The battery cell tapers off at one of its ends (as shown at 6). Into the other end 7 of the cell threads 8 are cut or pressed which serve the purpose of fixing the cage or cap 9 carrying the lamp, the reflector and the switch.

The dry cell is closed by the usual paraffin wax seal 10. Through this seal the carbon electrode 2 projects which is preferably covered with a metal cap 11.

The member 9 carrying the reflector, lens and switch comprises a cage 12 of any appropriate shape, preferably cylindrical or conical, which is provided at both ends with cylindrical screw threaded portions 14, 15. The screw threaded portion 14 engages the threads 8 at the end of the battery cell.

The cage carries the switch 18 which may be closed either by pressing a button 19, as shown, in the drawing thus pressing the contact member 20 against the metallic reflector 22 or against some other metallic part, or by sliding the member 20 into contact with another member as well known.

The other screw threaded end 15 of the cage receives an annular cap 24, pressing and holding a lens 25, and the reflector 22, the latter being arranged between insulating washers 26, 27. The reflector 22 is of spherical or parabolical shape and in its center carries the lamp base ferrule 28 on which the lamp base is mounted. The socket holder 29 is held by the ferrule or the reflector base and is threaded at 30 and the lamp socket 34 in the form of a plastic nut is screwed into it. A spring 31 may be interposed to keep the part under elastic tension. The light bulb 35 is inserted into the socket 34 and fixed therein by one of the approved standard means with the tip 36 projecting downwardly and resting directly on the metal cap 11.

It will therefore be seen that the body of the flashlight consists of the battery cell 1 which is only distinguished from other batteries in that it is provided with screw threads at its ends and is covered with an exterior shell, cover or foil of an attractive appearance. This entire battery is replaced when exhausted. Batteries of different sizes may be used for different voltages and lamp bulbs. The flashlight case, therefore, is entirely dispensed with, thus reducing the weight and size of the flashlight. Nevertheless the battery and the user is fully protected.

The invention is described in specific terms but it is manifest that changes in the unessential details of the structure will not affect the invention.

I claim:

An electric flashlight comprising a cage, a reflector insulated from and carried by said cage, an insulated lamp socket attached to said reflector, a light bulb with a tip contact held by said socket with its tip projected through the socket, said cage being threaded at each end, a cap containing a lens secured to a first of the threaded ends of said cage maintaining the reflector in insulated relationship with said cage, a replaceable handle comprising a battery cell having a central positive electrode and a composite cover consisting of two sheets, one formed of a conductive metal and the other of a metal adapted to form the negative electrode forming a unitary cell cover, said composite cover being threaded at one end and in engagement with the second end of the cage by means of the screw threads thereon, said central electrode thus being brought into contact with the projected tip contact of the light bulb, spring means encompassing said bulb within said socket and biasing said bulb maintaining said tip contact and said central electrode in engagement, and means secured to said cage selectively closing an electric circuit between said cage and said reflector.

YETTA SAMALION.

REFERENCES CITED

The following references are of record in the file of this patent:

UNITED STATES PATENTS

| Number | Name | Date |
| --- | --- | --- |
| 688,403 | Frazier | Dec. 10, 1901 |
| 720,592 | Kohn | Feb. 17, 1903 |
| 1,233,204 | Dunn | July 10, 1917 |
| 1,297,654 | Burgess | Mar. 18, 1919 |
| 1,398,799 | Recker | Nov. 29, 1921 |
| 1,700,768 | Kuechenmeister | Feb. 5, 1929 |
| 2,254,474 | Deibel | Sept. 2, 1941 |
| 2,255,516 | McEachron et al. | Sept. 9, 1941 |
| 2,272,907 | Deibel | Feb. 10, 1942 |